United States Patent
Bradley et al.

[19]

[11] Patent Number: 6,131,631
[45] Date of Patent: Oct. 17, 2000

[54] PRESS PLUG SUPPORT FOR TIRE INFLATION SYSTEM

[75] Inventors: John Allen Bradley, Natalia; Mark Kevin Hennig, Corpus Christi, both of Tex.

[73] Assignee: Equalaire Systems, Inc., Corpus Christi, Tex.

[21] Appl. No.: 09/309,140

[22] Filed: May 10, 1999

[51] Int. Cl.[7] .................................................. B60C 23/00
[52] U.S. Cl. ............................................................ 152/417
[58] Field of Search ..................... 152/415, 416, 152/417, 418

[56] References Cited

U.S. PATENT DOCUMENTS 5,584,949  12/1996  Ingram .
5,769,979   6/1998  Naedler .

FOREIGN PATENT DOCUMENTS 3619603  1/1987  Germany ................................ 152/417

Primary Examiner—Russell D. Stormer
Attorney, Agent, or Firm—Fulbright & Jaworski

[57] ABSTRACT

A press plug for use in an inflation system for supplying air to the rotating tires on a vehicle. The press plug provides the function of sealing pressure in an axle and providing support by rotary air connection by engaging the inside of the axle and being held in place by an interference fit. The press plug includes a tapered flange for providing both a seal and retaining feature for holding the press plug in position.

8 Claims, 3 Drawing Sheets

6,131,631

PRESS PLUG SUPPORT FOR TIRE INFLATION SYSTEM

FIELD OF THE INVENTION

The present invention is directed to an improvement in an automatic tire inflation system (ATIS) in which the air in rotating vehicle tires is controlled through a rotary air connection between an air supply in the axle and the tires. In particular the present invention is directed to an improved plug supporting the rotary air connection by providing a press plug which sealingly engages the inside of the axle and is held in place in the axle by an interference fit and which engages and supports the rotary air connection.

BACKGROUND OF THE INVENTION

It is known, as disclosed in U.S. Pat. No. 5,769,979, entitled "Rotary Air Connection for Tire Inflation System," to provide a plug which sealingly engages the inside of an axle for supporting a rotary air connection for connecting an air supply in the axle to each of the rotating tires. In such a system, the plug provides a pressure barrier to contain the pneumatic pressure within the axle. However, such a plug and other types of plugs require that the interior of the axle be machined or modified to accept such a supporting plug. This increases the expense of the installation.

The present invention is directed to the improvement in an air inflation system of a plug supporting the rotary air connection. The plug of the present invention is a press plug which sealingly engages the inside of the axle and is held in place in the axle by an interference fit without requiring additional mechanical means for locking the plug in place. The plug will provide a pressure barrier to contain the pneumatic pressure within the axle and will engage and support the rotary air connection. Therefore, the press plug of the present invention will provide a sealing pressure barrier as well as a support without requiring special machining or modification of the inside of the axle and thus is less expensive than current type plug. Thus, the present invention can be used in a standard non-modified spindle bore.

SUMMARY OF THE INVENTION

The present invention is directed to an air inflation system for a vehicle having at least one axle with at least one wheel having a pneumatic tire at each end of the axle. The vehicle includes an air supply supplying air to the inside of an axle and a rotary air connection in communication with the air in the axle and the pneumatic tires. A press plug is provided sealingly engaging the inside of the axle and is held in place in the axle by an interference fit. The plug includes a circular body having an axial opening therethrough for engaging and supporting the rotary air connection.

A tubular flange is connected to one side of the body and extends away from the body in a generally axial direction with the flange tapering smaller in cross section in a direction away from the body. The flange tapers outwardly away from the axis in a direction away from the body for providing an interference fit with the inside of the axle.

A further object is the provision of a circular groove in the outer periphery of the body having a seal therein.

Still a further object of the present invention is wherein the press plug is metal. Preferably, the plug is selected from a carbon alloy steel such as 4130 or 4140.

A further object of the present invention is wherein the plug is heat treated and preferably wherein the heat-treated plug is coated with zinc for resisting corrosion.

Yet a further object of the present invention is wherein the interference fit between the plug and the inside of the axle is generally between 0.030 and 0.050 inches.

Still a further object of the present invention is wherein the flange has an outwardly extending sharp edge for engaging the inside of the axle for further retaining the plug in the axle.

Other and further objects, features and advantages will be apparent from the following description of a presently preferred embodiment of the invention, given for the purpose of disclosure and taken in conjunction with the accompanying drawings.

DETAILED DESCRIPTION OF THE PREFERRED EMBODIMENT

Figure 1:
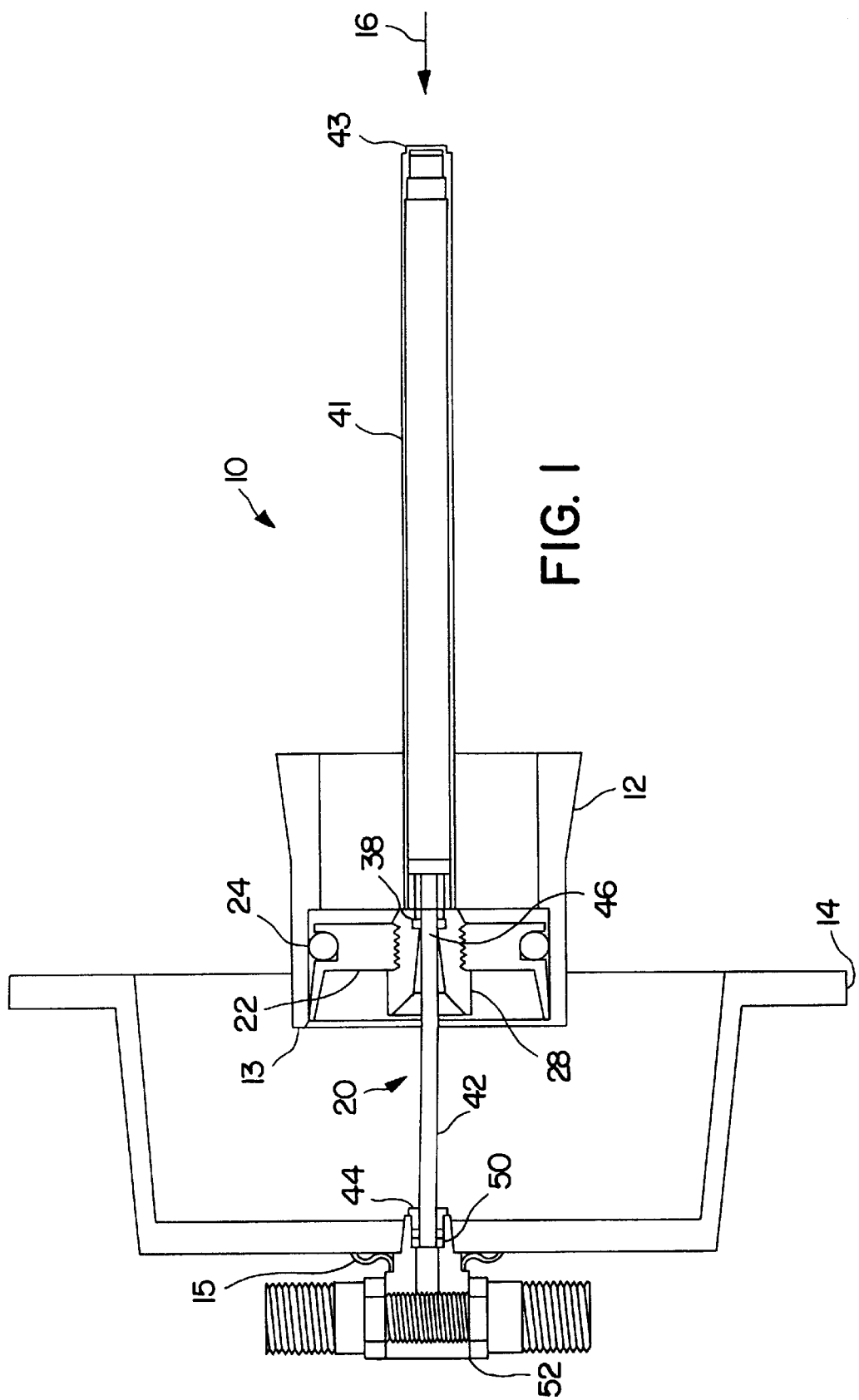
FIG. 1 is an elevational view, in cross section, of the air inflation system of the present invention.

Referring now to FIG. 1, reference numeral 10 generally indicates an air inflation system of the present invention for supplying air from an air supply on a vehicle such as a truck trailer in a tire inflation system for a vehicle to the rotating tires. The numeral 12 generally indicates one axle or spindle of a trailer having a plurality of axles with wheels having one or more tires at each end of the axles 12. A hub cap 14 at end of the axle 12, having a relief valve 15, retains lubricant in the wheel bearings, and an air supply 16 supplies air to the inside of the axle 12, all as described in U.S. Pat. No. 5,584,949, which, for a fuller disclosure, is incorporated herein by reference.

A pneumatic rotary union or rotary air connection generally indicated by the reference numeral 20 is supported and positioned in the center of each end of the axle 12 such as by a plug 22, which sealngly engages the interior of the axle 12 by a seal 24, and in turn is sealed from the exterior of the rotary air connection 20. The union 20 has a first stationary part or stator 28 having an air passageway therethrough and a stationary rotary seal 38 is supported by the stator 28 and encircles the passageway. The rotary air connection 20 includes a second rotatable part including an elongate rigid tubular member 42, preferably metal, having a first end 44 and a second end 46. The second end 46 is coaxially extendable through and is longitudinally and rotatably movable in the stator 28 and sealingly engages the seal 38 and is in communication with the air 16 inside of the axle 12 through a filter tube 41 and filter 43. The first end 44 of the tubular member 42 is sealingly connected to the hub cap 14 through a floating seal 50. An air connection 52 or tee is provided on the hub cap 14 for connection to the tire or tires at the end of the axle 12.

The above described air inflation system is generally described in U.S. Pat. No. 5,769,979, which, for a fuller disclosure, is incorporated herein by reference.

While the previous plugs used in the prior art have been satisfactory, they have generally required machining of the ends of the axle or spindle 12 and have required fastening or locking means for mechanically holding the plug in the inside of the ends of the axle 12 against air pressure. All of this results in a more expensive installation. However, the plug 22 must perform the function of providing a pressure resistant barrier against the air pressure 16 when installed in the bore of the spindle or axle 12 as well as providing a support for the rotary air connection 20.

Figure 2:
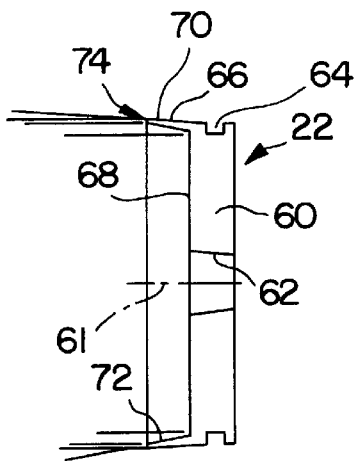
FIG. 2 is an elevational view, in cross section, of the press plug of the present invention.
Figure 3:
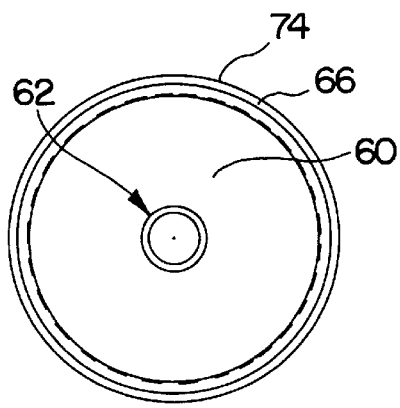
FIG. 3 is an end view of the press plug of FIG. 2.
Figure 4:
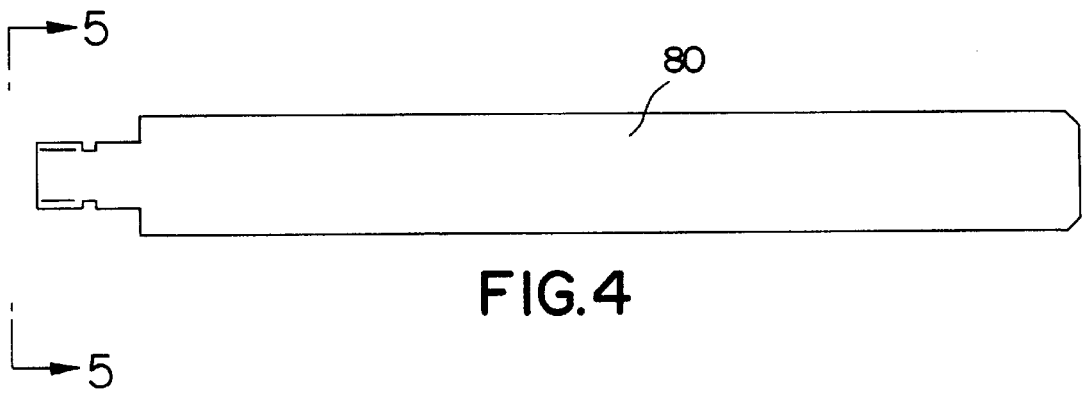
FIG. 4 is an elevational view of a drive handle for aiding in installing the press plug of FIG. 2.
Figure 5:
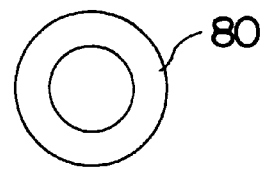
FIG. 5 is a cross-sectional view taken along the line 5—5 of FIG. 4.
Figure 6:
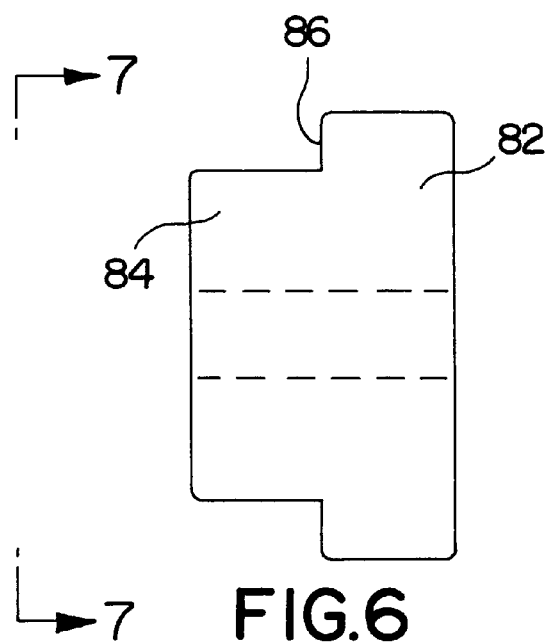
FIG. 6 is an elevational view of the drive adapter used with the handle of FIGS. 4 and 5 for inserting the press plug in an axle.
Figure 7:
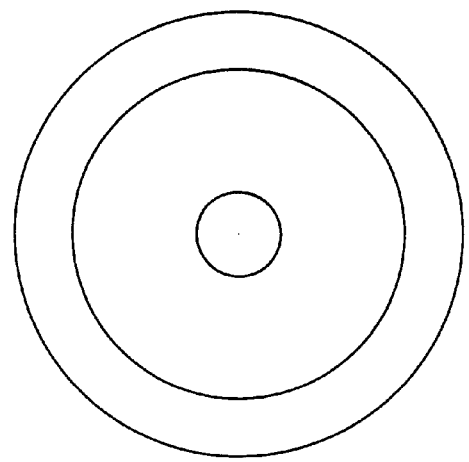
FIG. 7 is an end view taken along the line 7—7 of FIG. 6.

The present invention is directed to a press plug 22 as best seen in FIGS. 1, 2 and 3 which provides the necessary pressure barrier and rotary air coupling support. The press plug 22 of the present invention sealingly engages the inside of the axle or spindle 12 and is held in place in the axle by an interference fit. By the use of the interference fit, no other mechanical means is required for retaining the press plug 22 in the interior of the axle 12. The plug 22 includes a circular body 60 having an axial opening 62 therethrough which is threaded for engaging and supporting the stator 28 of the rotary air connection 20. Preferably, the body 60 includes a circular groove 64 in its outer periphery for supporting a resilient seal 24 such as an elastomeric seal for additional sealingly engaging the inside of the axle 12.

A tubular flange 66 is connected to one side 68 of the body 60 and extends away from the body 60 in a generally axial 61 direction. The flange 66 is tapering smaller in cross section in a direction away from the body 60. In addition, the flange tapers outwardly away from the axis 66 in a direction away from the body 60. Thus, the flange 66, when the press plug 22 is driven into the inside of the axle or spindle 12, provides an interference fit with the interior axle 12 thereby providing both a seal and a mechanical means of retaining the press plug 22 in the inside of the axle 12.

Preferably, the press plug is metal and the preferable embodiment is a carbon alloy steel of a material such as 4130 or 4140. In addition, it is desirable to heat treat the plug 22 to 28–32 Hrc. The heat treatment of the press plug 22 allows installation into the bore of the axle 12 without permanent yielding or defamation of the press plug 22 material. Furthermore, it is desirable to zinc-plate the press plug 22 after heat treatment per ASTM B633, Type 2, SC2 minimum. The zinc coating is desirable to prevent corrosion and could affect final interference fit and resulting pressure resistance. And preferably, the press plug 22 is held in place with a diametrical interference fit between the flange 66 of the plug 22 and the inside of the axle 12, generally between 0.030 and 0.050 inches to produce a maximum stress level between 75 and 90% of the yield strength of the press plug material.

As discussed above, it is noted that the flange 66 tapers smaller in cross section in a direction away from the body 60 and also tapers outwardly from the axis 61 in a direction away from the body 60. Thus, in the preferred embodiment, the flange 66 includes an outer side 70 which extends outwardly approximately 4° away from the axial direction 61 or 86° from the vertical. And the flange 66 has an inside side 72 which extends away from the axis 61 at an angle of 10° or 80° from the vertical. Such a configuration provides an outer sharp edge 74 which, with the interference fit, engages and provides additional retaining force for the press plug 22 on the inside of the axle 12.

While the press plug 22 has been described in connection with the particular air coupling shown in U.S. Pat. No. 5,769,979, it is to be understood that various other types of rotary air connections may be used.

While various methods may be used to install the press plug 22 of the present invention on the inside of the spindle or bore 14, preferably the steps including blowing a high volume of air through the inside of the axle 14 to remove any debris on the inside of the axle 12, polishing the inside of the end of the axle or spindle 12 to remove any residual debris or machine marks, applying a retaining compound to the outside diameter of the press plug 22 and seal 24, such as LOCTITE, and inserting the press plug 22 into the end of the spindle or axle 12.

One type of tool for driving the press plug 22 to the inside of the spindle 12 with an interference fit is best shown in FIGS. 4, 5, 6 and 7. A drive handle 80 is connected to a drive adapter 82 having a first end 84 for engaging the side 68 of the body 60 of the press plug 22. The press plug 22 is driven into the inside of the spindle bore using a hammer until the shoulder 86 of the drive adapter bottoms on the outer end 13 of the spindle 12 providing the desired interference fit. The drive adapter 82 and handle 80 are removed, the rotary connection 22 is inserted and the air inflation system is ready for use.

The present invention, therefore, is well adapted to carry out the objects and attain the ends and advantages mentioned as well as others inherent therein. While a presently preferred embodiment of the invention has been given for the purpose of disclosure, numerous changes in the details of construction, and arrangement of parts will be readily apparent to those skilled in the art and which are encompassed within the spirit of the invention and the scope of the appended claims.

What is claimed is:

1. In an air inflation system for a vehicle having at least one axle with at least one wheel having a pneumatic tire at each end of the axle and said vehicle having an air supply supplying air to the inside of the axle and a rotary air connection in communication with the air in the axle and said pneumatic tires, the improvement in a plug supporting the rotary air connection comprising:

a press plug sealingly engaging the inside of the axle and held in place by an interference fit, said plug including a circular body having an axial opening therethrough for engaging and supporting the rotary air connection, a tubular flange connected to one side of the body and extending away from the body in a generally axial direction, said flange tapering smaller in cross section in a direction away from the body, and said flange tapering outwardly away from the axis in a direction away from the body.

2. The apparatus of claim 1 wherein the plug is metal.

3. The apparatus of claim 2 wherein the plug is selected from a group selected from a group of 4130 or 4140 material.

4. The apparatus of claim 3 wherein the plug is heat treated.

5. The apparatus of claim 4 wherein the plug is coated with zinc.

6. The apparatus of claim 1 wherein the interference fit between the flange of the plug and the inside of the axle is generally between 0.030 and 0.050 inches.

7. The apparatus of claim 1 wherein the flange has an outwardly extending sharp edge for engaging the inside of the axle.

8. The apparatus of claim 1 wherein said body includes a circular groove in an outer periphery having a seal therein.

* * * * *